(12) United States Patent
Bearup et al.

(10) Patent No.: US 8,783,587 B2
(45) Date of Patent: Jul. 22, 2014

(54) MOBILE WASHER UNIT

(75) Inventors: Adam Dean Bearup, Lakewood, CO (US); Glenn Richard Schmierer, Longmont, CO (US); Roger Pedlar, Lakewood, CO (US); Agustin Garcia Arellano, Monterrey N.S. (MX); Jerry G. Gradwohl, Vancouver, WA (US); Gerardo Angel Gonzalez Chapa, Apodaca N.L. (MX)

(73) Assignee: Karcher North America, Inc., Englewood, CO (US)

( * ) Notice: Subject to any disclaimer, the term of this patent is extended or adjusted under 35 U.S.C. 154(b) by 533 days.

(21) Appl. No.: 13/047,539

(22) Filed: Mar. 14, 2011

(65) Prior Publication Data

US 2012/0234938 A1    Sep. 20, 2012

(51) Int. Cl.
B05B 3/18    (2006.01)

(52) U.S. Cl.
USPC ........................ 239/722; 280/47.315

(58) Field of Classification Search
USPC ........... 239/124, 71, 437, 525, 530, 438, 393, 239/436
See application file for complete search history.

(56) References Cited

U.S. PATENT DOCUMENTS

| | | | |
|---|---|---|---|
| 4,865,255 A | | 9/1989 | Luvisotto |
| 5,700,137 A * | | 12/1997 | Simonette ................ 417/364 |
| 6,695,235 B2 * | | 2/2004 | Faller et al. .............. 239/722 |
| 6,892,957 B2 | | 5/2005 | Bennett et al. |
| 6,935,642 B1 * | | 8/2005 | Craig et al. ............ 280/47.24 |
| 7,083,120 B2 | | 8/2006 | Gilpatrick et al. |
| 7,198,204 B2 | | 4/2007 | Bennett et al. |
| 7,533,435 B2 | | 5/2009 | Pedlar et al. |
| 7,562,780 B2 | | 7/2009 | Gilpatrick et al. |
| 7,896,174 B2 | | 3/2011 | Gilpatrick et al. |
| 8,398,097 B2 | | 3/2013 | Junk et al. |
| 2005/0189437 A1 * | | 9/2005 | Alexander et al. ........... 239/332 |
| 2005/0217708 A1 | | 10/2005 | Otterson |
| 2007/0207042 A1 | | 9/2007 | Hahn et al. |
| 2010/0108781 A1 | | 5/2010 | Terrizzi et al. |

OTHER PUBLICATIONS

U.S. Appl. No. 13/117,804, filed May 27, 2011, Bearup et al.
Notice of Allowance for U.S. Appl. No. 13/117,804, mailed Oct. 18, 2013, 7 pages.
Restriction Requirement for U.S. Appl. No. 13/117,804, mailed Apr. 17, 2013, 5 pages.
Official Action for U.S. Appl. No. 13/117,804, mailed May 16, 2013, 6 pages.

* cited by examiner

*Primary Examiner* — Len Tran
*Assistant Examiner* — Viet Le
(74) *Attorney, Agent, or Firm* — Sheridan Ross P.C.

(57) ABSTRACT

A mobile pressure washing system is provided. The system comprises a frame with hinged elements for transitioning the frame between an upright position of use and a compact position for secure transport and storage of the system. System features further include a removable and replaceable tank adapted to fit on a portion of the frame, storage features, and pressure washing features such as a motor and pump.

25 Claims, 13 Drawing Sheets

MOBILE WASHER UNIT

FIELD OF THE INVENTION

The present invention relates generally to mobile cleaning and washer units. More specifically, the present invention relates to high pressure washing systems generally contained on or within a frame structure, wherein elements or features for cleaning or working operations as well as features for mobility are connected on or to the frame.

BACKGROUND

High pressure washers are useful for cleaning a wide variety of objects such as patios, decks, deck hulls, aluminum and vinyl siding, tennis courts, and gutters. There are many known types high pressure washing systems which generally comprise one or more engines that power a high pressure pump. The pump is normally connected to a water source at a low pressure, such as to a municipal water source via a hose. The low pressure water is generally passed through the pump and converted to high pressure outlet fluid. A high pressure line may be attached to a wand for directing high pressure flow.

Particularly with heavier high pressure cleaning units, a pump and engine are oftentimes mounted on a frame having wheels and pushed and/or pulled by the operator manually from location to location. Placing such devices on a frame, however, significantly increased the overall size of the device and in certain instances acts to impede the mobility that was intended to be enhanced.

The cumbersome nature of known high pressure washing units further complicates and impedes a user's ability to carry or transport additional devices, products and items which may be useful or required in cleaning operations. For example, known units require sufficient user attention, energy and effort that transporting additional items such as tools, cleaning products and solutions, and other related goods is rendered impracticable.

SUMMARY OF THE INVENTION

Accordingly, the present invention contemplates a novel system, device, and methods of use for mobile pressure washing apparatus comprising a foldable frame with additional features adapted for housing and/or transporting various additional products and tools.

The Summary of the Invention is neither intended nor should it be construed as being representative of the full extent and scope of the present disclosure. The present disclosure is set forth in various levels of detail in the Summary of the Invention as well as in the attached drawings and the Detailed Description of the Invention and no limitation as to the scope of the present disclosure is intended by either the inclusion or non-inclusion of elements, components, etc. in this Summary of the Invention. Additional aspects of the present disclosure will become more readily apparent from the Detailed Description, particularly when taken together with the drawings.

The following references related to pressure washing systems are hereby incorporated by reference in their entireties: U.S. Pat. No. 7,198,204 to Bennett et al., U.S. Pat. No. 6,892,957 to Bennett et al., U.S. Pat. No. 4,865,255 to Luvisotto, U.S. Pat. No. 7,083,120 to Gilpatrick et al., U.S. Pat. No. 6,695,235 to Faller et al., U.S. Patent Application Publication Nos. 20100108781 to Terrizzi et al., and 20050217708 to Otterson.

In various embodiments, a mobile pressure washing system is provided having a frame to carry components of the system and to create a handle or user interface portion for mobility of the system. In one embodiment, the handle is selectively positionable by a user between at least a first and second position, the first position being a generally upright position for user manipulation and/or rolling of the device and the second position being a generally compact position of non-use. The generally compact position of non-use may be utilized, for example, when the device is to be stored or transported in a position of non-use.

In one embodiment, selectively locating the frame in the second position additionally provides for protection of various elements of the device including, but not limited to, motors, pumps, tanks, valves, and similar features. Thus, in various embodiments, a mobile pressure washing device is provided comprising a first position of use and a second position of non-use wherein the second position of non-use is adapted for minimizing the overall height of the device, as well as, protecting various elements of the device.

In yet another embodiment, a mobile pressure washing device is provided with a tank adapted to hold various fluids (e.g. cleaning fluids) which may be selectively secured to a frame of the device by a user. The tank may be of the molded or rotomolded plastic variety and serve to house various fluids, as well as, provide a buffer between device components and various external objects or structures.

In another embodiment, the mobile pressure washing device is provided with one or more plastic storage devices attached to a handle portion of the frame. The one or more plastic storage devices are adapted to house or transport various tools and cleaning supplies and further provide additional protection for device components when the handle portion of the frame is disposed in a second position of non-use. Plastic storage devices for use in the present invention may comprise, for example, recesses of predetermined size for accommodating known containers, mesh, netted and/or elastic features for accommodating of wide variety of objects or containers, covers or lids for selectively securing contents, and/or various control features for user-operation of various device functions.

In a particular embodiment, a mobile pressure washing device is provided with a storage area in an upper portion of the device where the storage area is adapted to house various user-selected containers. Thus, in at least one embodiment, a user may optionally place one or more containers (e.g. a one-gallon container of cleaning solution) securely in an upper portion of the device. It is further contemplated that a tube is provided, the tube being operatively connected to pump and washing elements at one end and free at an opposing end such that it may be inserted into previously described user-selected containers. Thus, user-selected containers and the contents thereof may be optionally integrated into water streams and/or washing operations.

In yet another embodiment, a mobile pressure washing device is provided with features for accommodating a wand. For example, in a particular embodiment, a removable rubber cone is provided on the aforementioned tank portion of the device, the rubber cone adapted to receive a portion of an elongate wand for use in spraying and/or cleaning operations. An additional feature is provided on a handle portion of the frame to receive another portion of the wand and further support such a device. In an alternative embodiment, a mobile washing device comprises such features for supporting a wand when the device is in a first position and additional features or recesses to receive and support a wand when the device is in a second position. One of skill in the art will recognize the utility provided by such a feature where, even when the unit is not positioned for use, it may still be desirable to securely store a wand and minimize the risk of damage or wear which may be placed on the wand.

In yet another embodiment, a mobile high pressure cleaning unit of the present invention comprises illumination features, such as one or more lights for assisting operations in night-time or low-light conditions.

These and other advantages will be apparent from the disclosure of the invention(s) contained herein. The above-described embodiments, objectives, and configurations are neither complete nor exhaustive. As will be appreciated, other embodiments of the invention are possible using, alone or in combination, one or more of the features set forth above or described in detail below. Further, the summary of the invention is neither intended nor should it be construed as being representative of the full extent and scope of the present invention. The present invention is set forth in various levels of detail in the summary of the invention, as well as, in the attached drawings and the detailed description of the invention and no limitation as to the scope of the present invention is intended to either the inclusion or non-inclusion of elements, components, etc. in this summary of the invention. Additional aspects of the present invention will become more readily apparent from the detailed description, particularly when taken together with the drawings.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
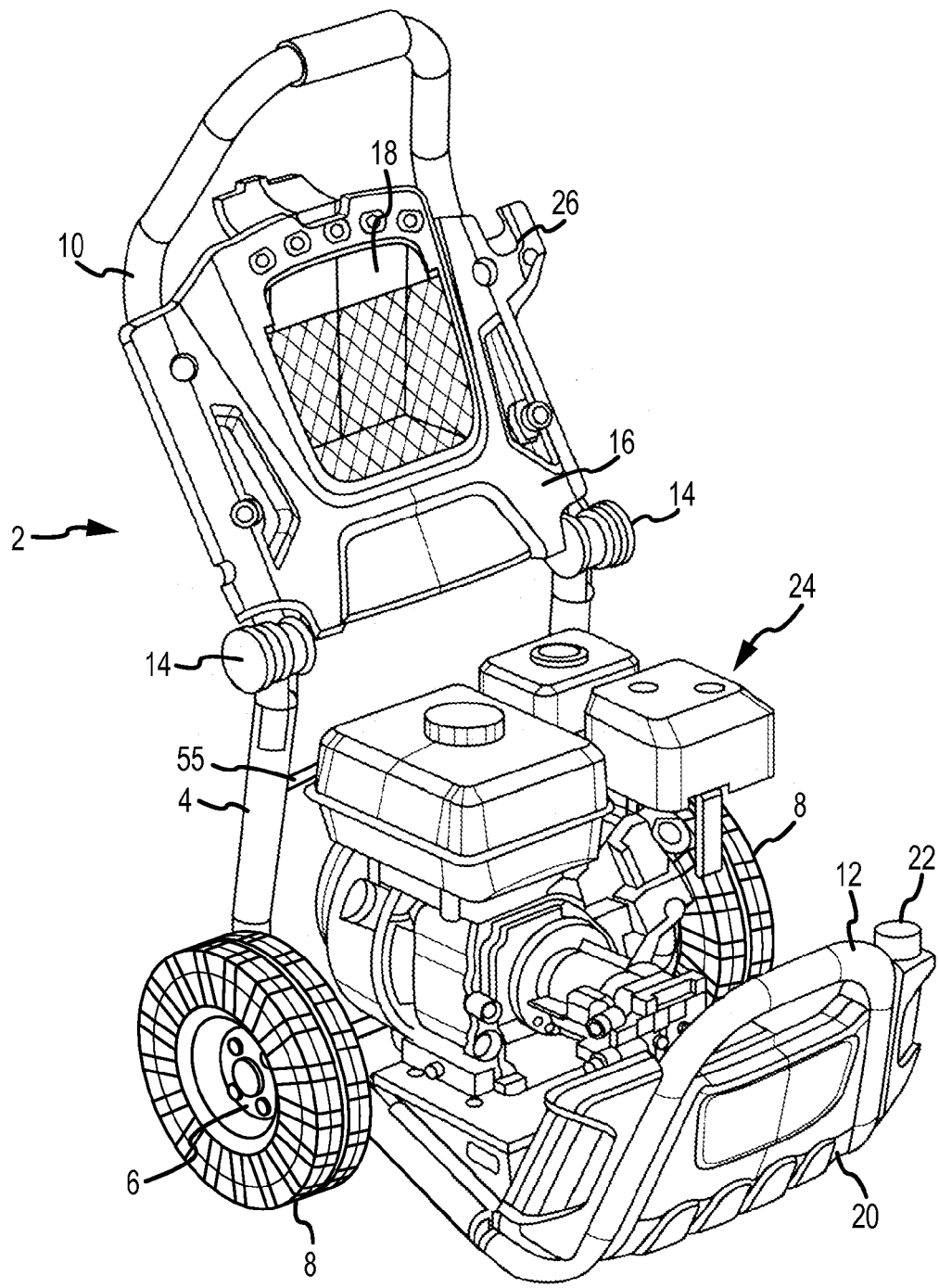
Figure 2:
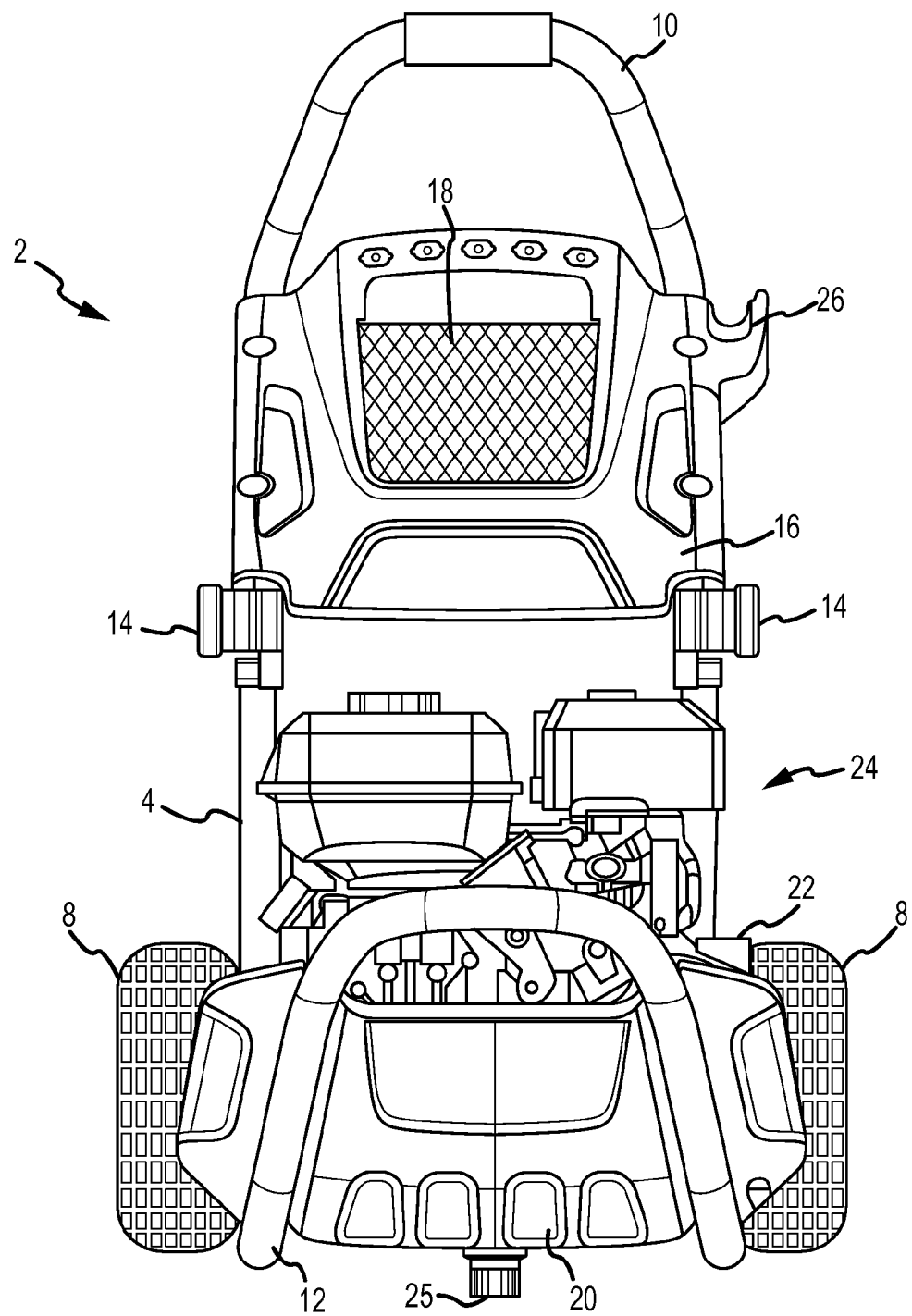
Figure 3:
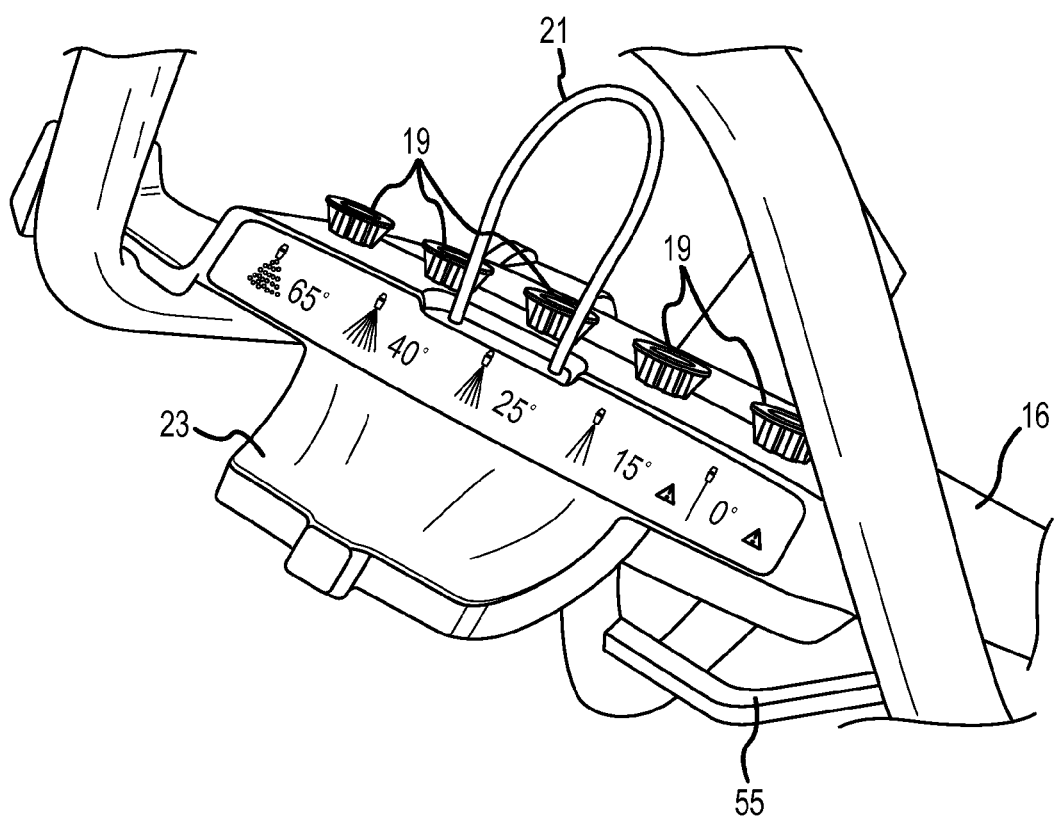
Figure 4:
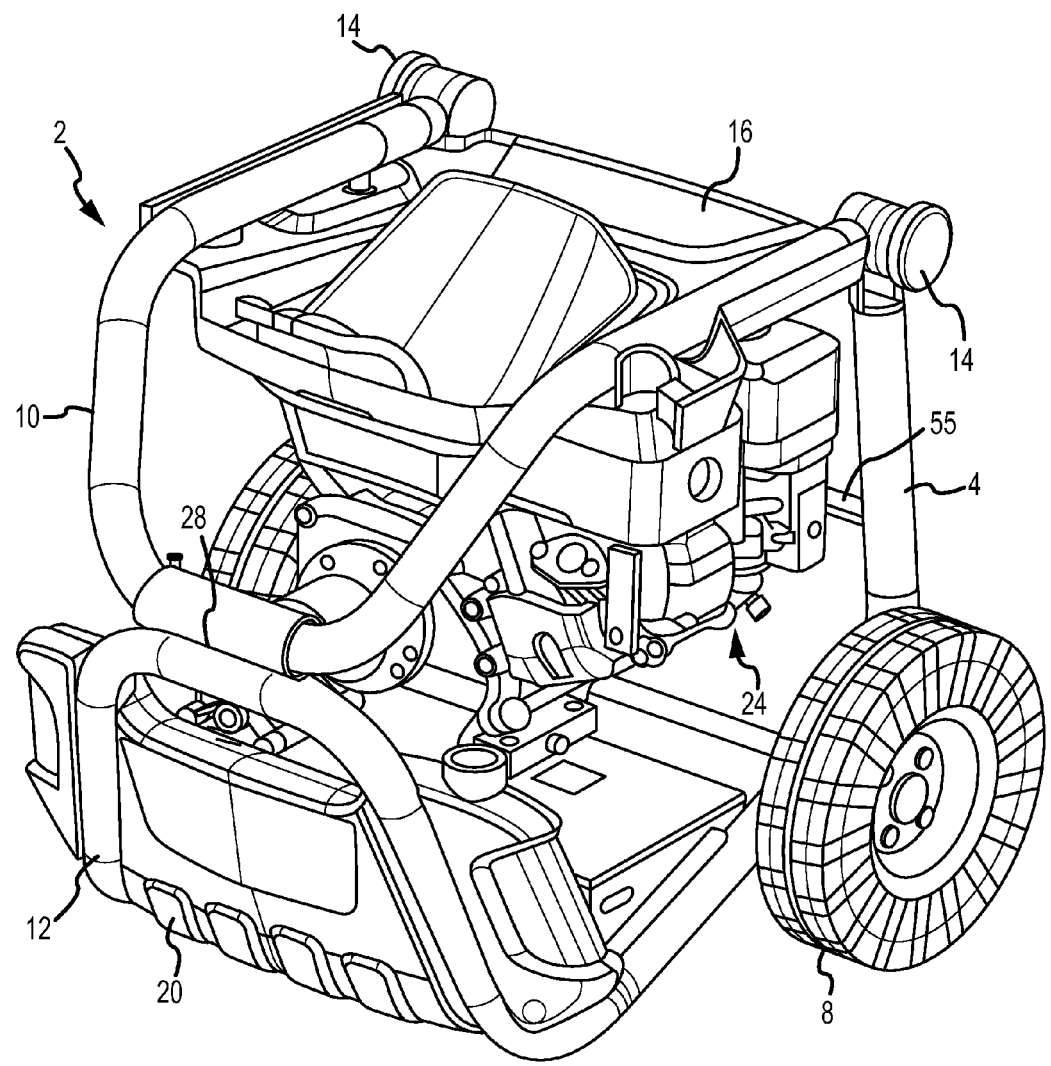
Figure 5:
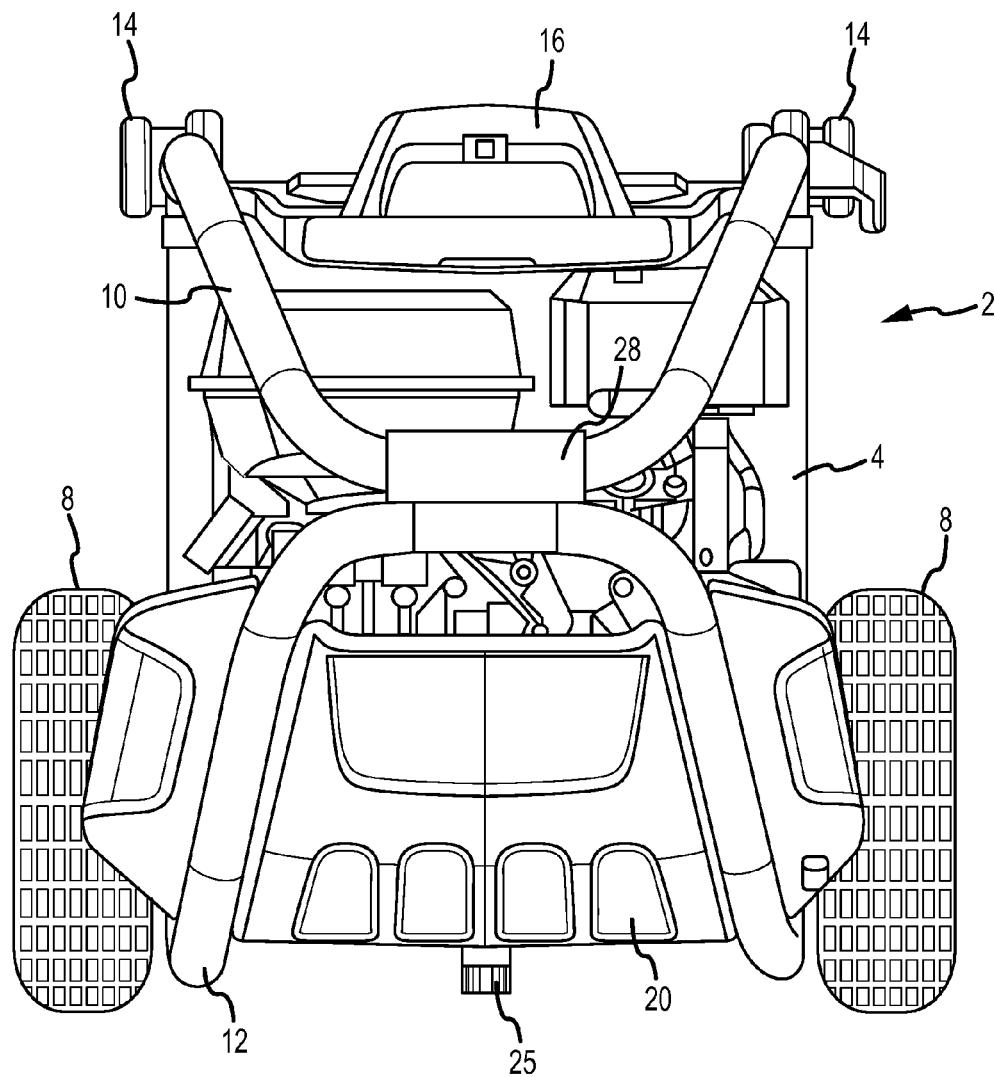
Figure 6:
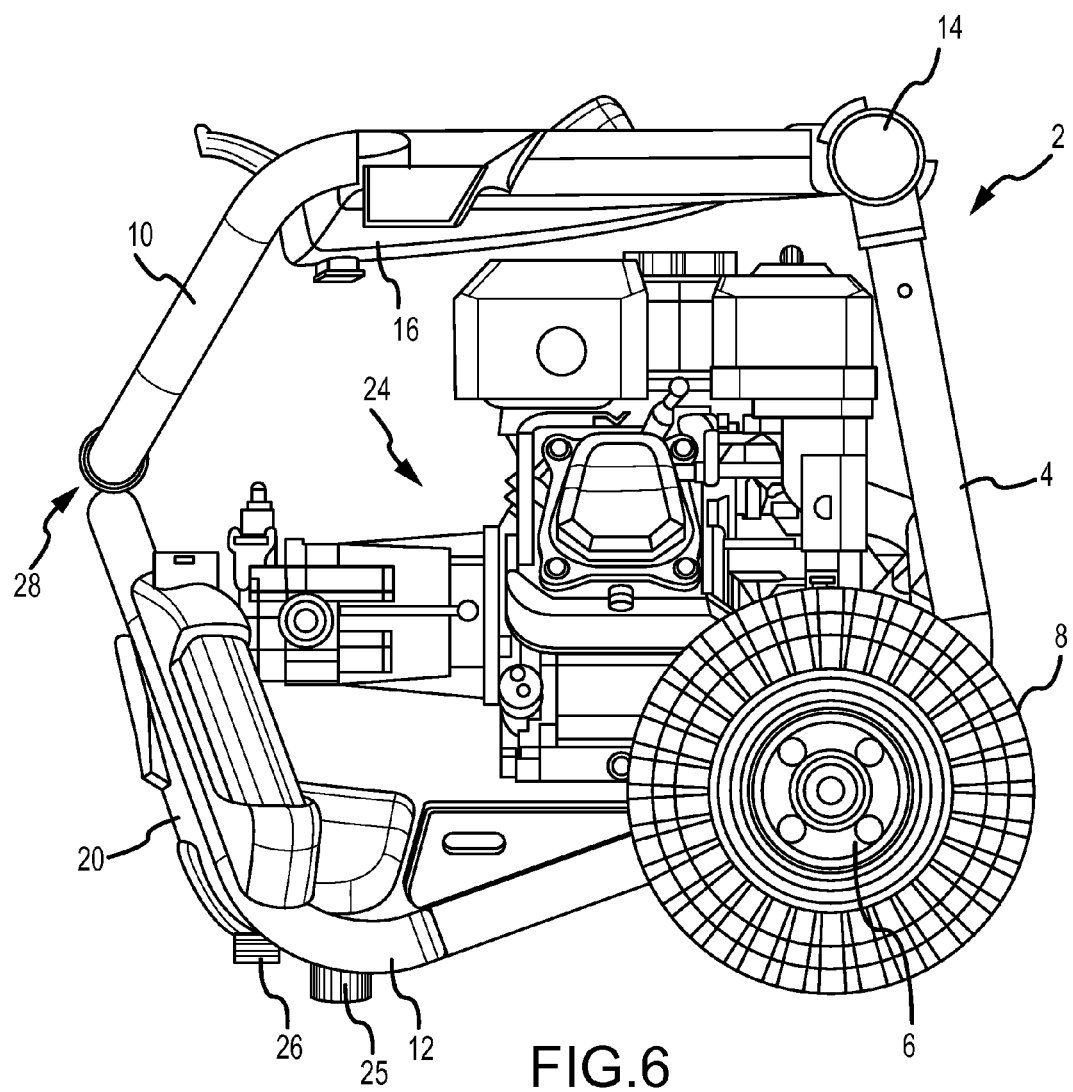
Figure 7:
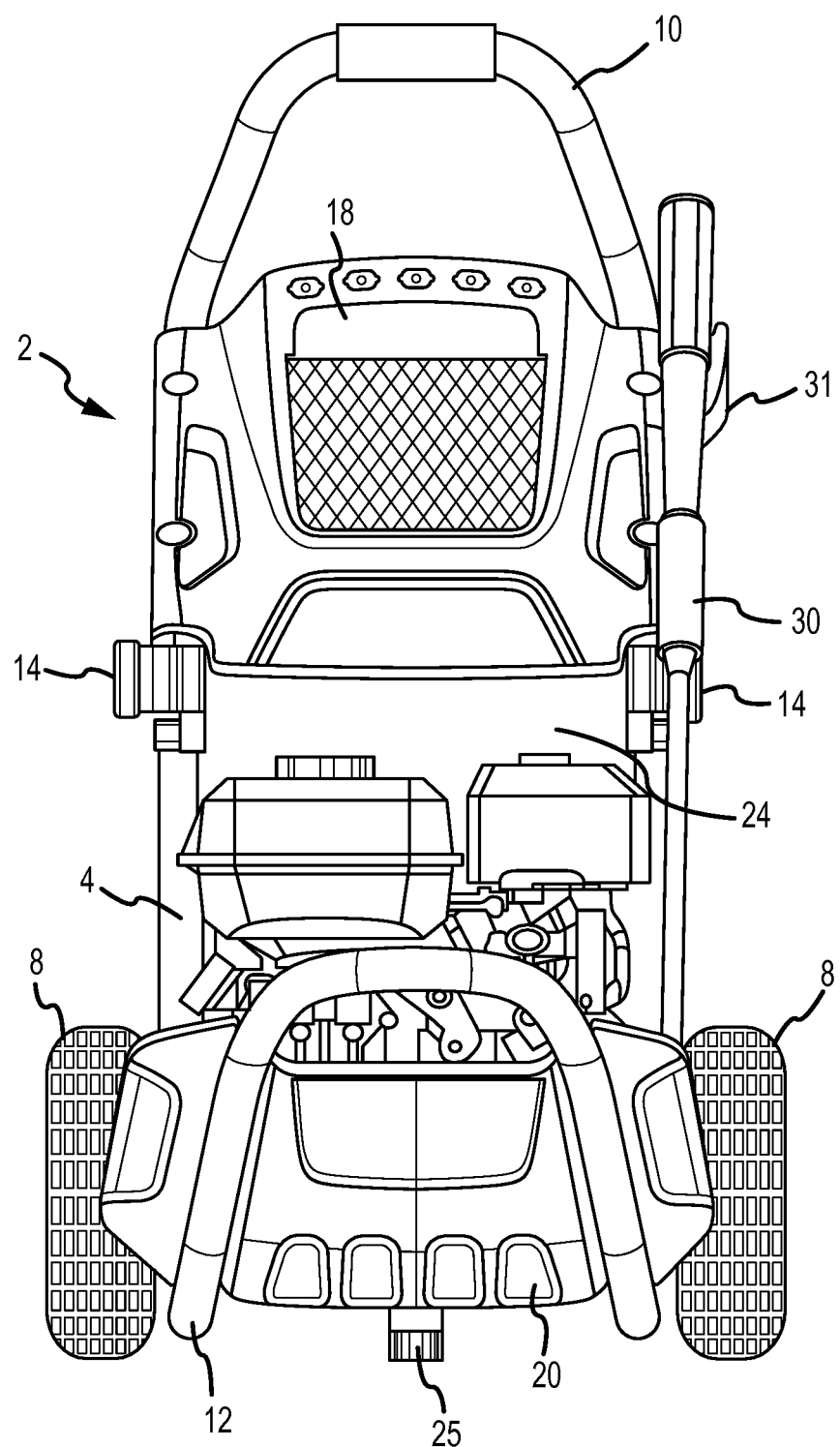
Figure 8:
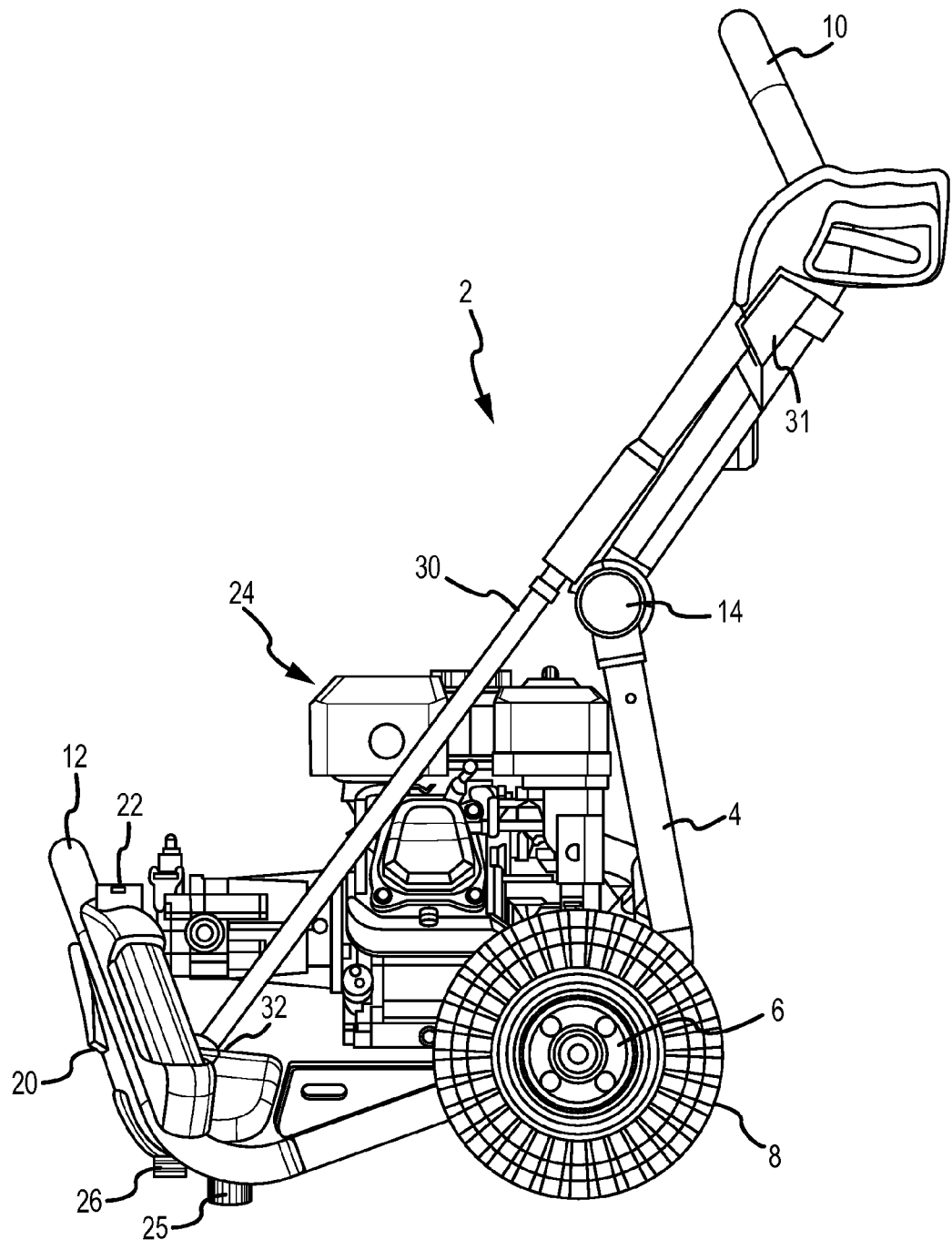
Figure 9:
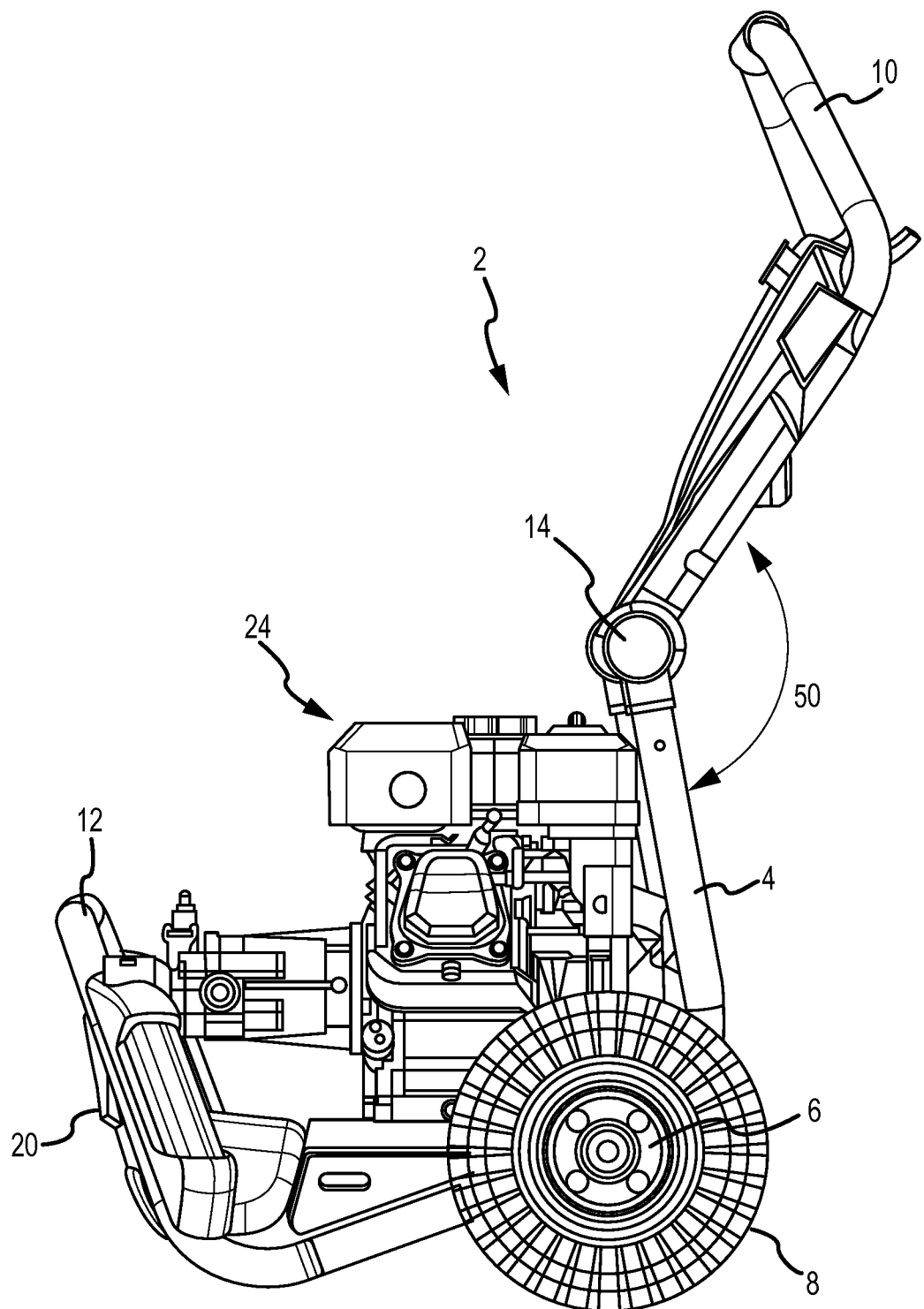
Figure 10:
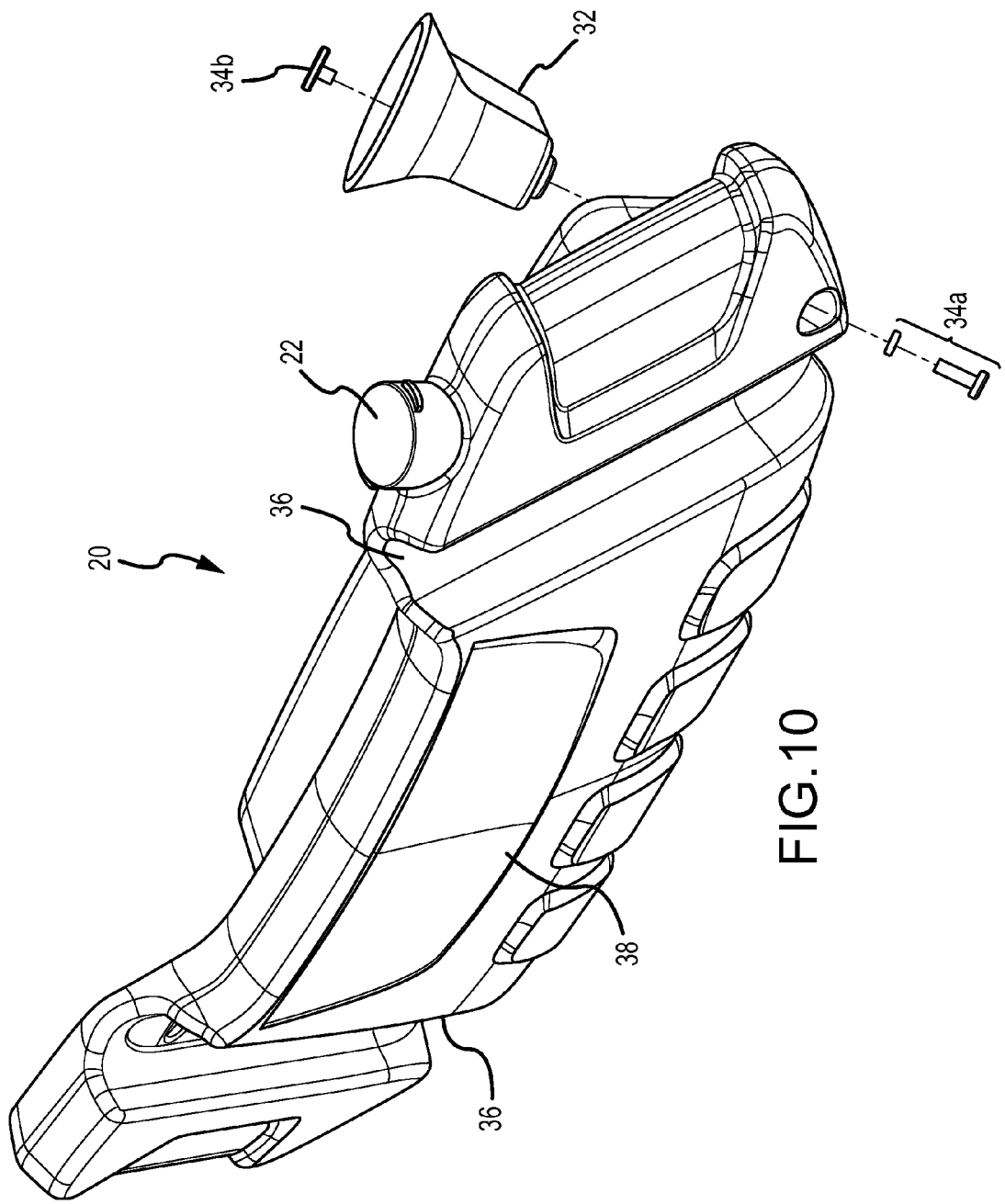
Figure 11:
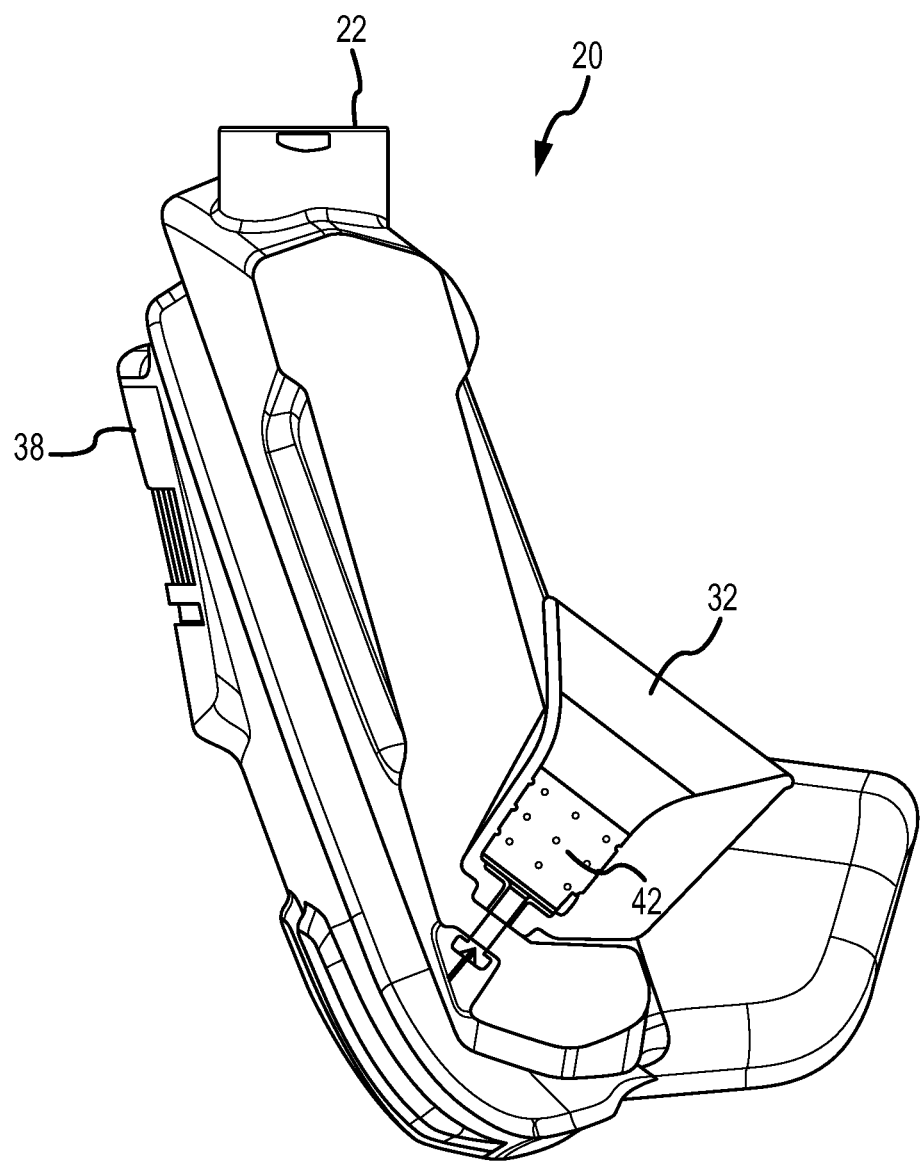
Figure 12B:
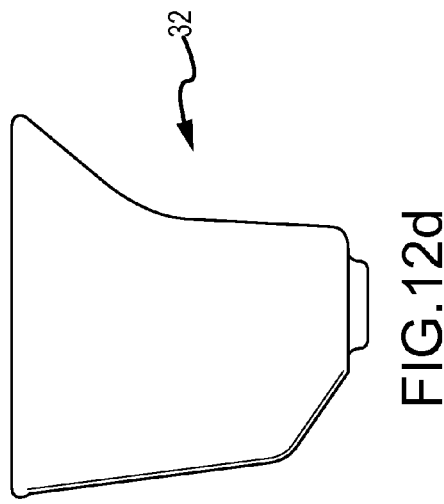
Figure 12A:
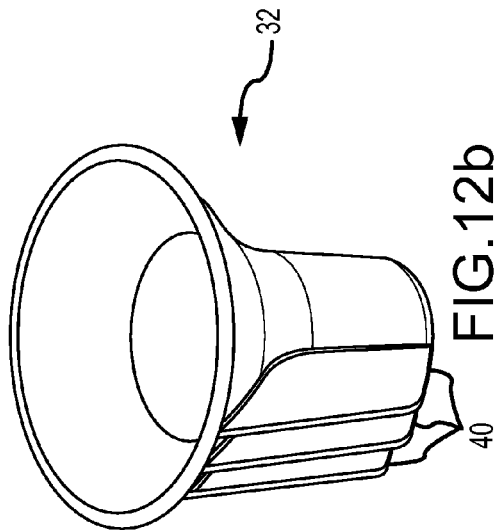
Figure 12D:
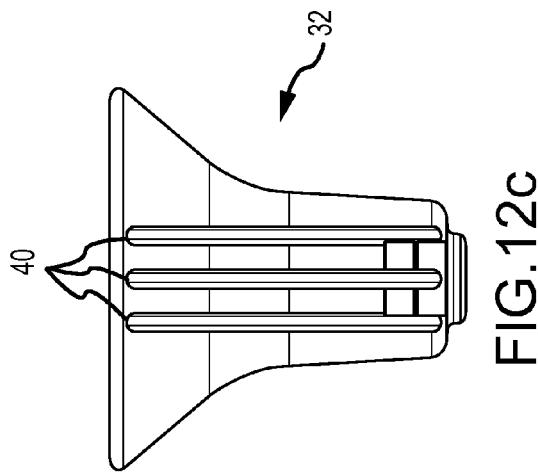
Figure 12C:
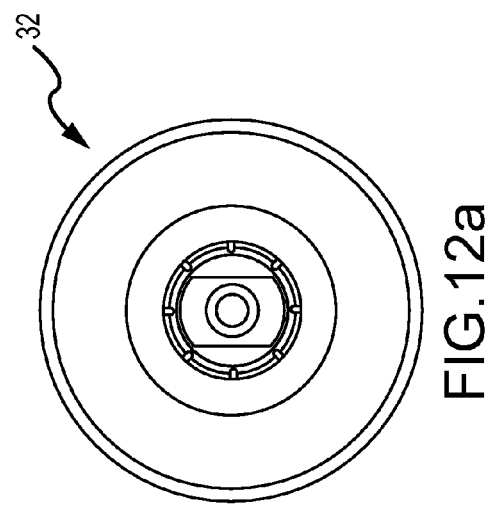
Figure 13:
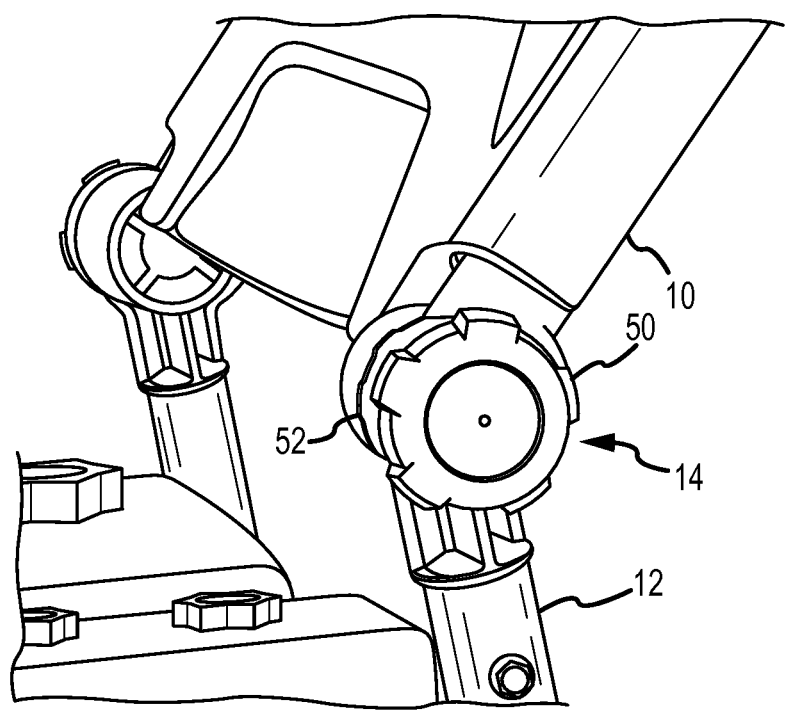

FIG. 1 is a front perspective view of a mobile high pressure washing device according to one embodiment;

FIG. 2 is a front elevation view of a mobile high pressure washing device according to one embodiment;

FIG. 3 is a perspective view showing various features of a mobile high pressure washing device according to one embodiment;

FIG. 4 is a front perspective view of a mobile high pressure washing device according to one embodiment;

FIG. 5 is a front elevation view of a mobile high pressure washing device according to one embodiment;

FIG. 6 is a side elevation view of a mobile high pressure washing device according to one embodiment;

FIG. 7 is a front elevation view of a mobile high pressure washing device according to one embodiment and comprising a wand;

FIG. 8 is a side elevation view of a mobile high pressure washing device according to one embodiment and comprising a wand;

FIG. 9 is a side elevation view of a mobile high pressure washing device according to one embodiment;

FIG. 10 is a front perspective view of a tank portion according to one embodiment;

FIG. 11 is a side elevation view of a tank portion according to one embodiment;

FIGS. 12a-d provide various views of a wand receiving feature according to one embodiment;

FIG. 13 is a perspective view showing various features of a mobile high pressure washing device according to one embodiment.

DETAILED DESCRIPTION

The present invention has significant benefits across a broad spectrum of endeavors. It is the applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment of the method that illustrates the best mode now contemplated for putting the invention into practice is described herein by, and with reference to, the annexed drawings that form a part of the specification. The exemplary method is described in detail without attempting to describe all of the various forms and modifications in which the invention might be embodied. As such, the embodiments described herein are illustrative, and as will become apparent to those skilled in the arts, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning Finally, unless a claim element is defined by reciting the word "means" and a function without the recital of any structure, it is not intended that the scope of any claim element be interpreted based on the application of 35 U.S.C. §112, sixth paragraph.

Referring now to FIGS. 1-13, a mobile high-pressure washing device according to various embodiments of the present invention is shown. It should be understood that the drawings are not necessarily to scale. In certain instances, details that are not necessary for an understanding of the invention or that render other details difficult to perceive may have been omitted from these drawings. It should be understood, of course, that the invention is not limited to the particular embodiments illustrated in the drawings.

FIG. 1 is a front perspective view of a mobile high pressure washing device 2 according to one embodiment. As shown, the device 2 comprises a frame having an upper or user-proximal portion 10 and a lower portion 12. The frame 4 is provided in part to support various device elements 24 and facilitate the transportation or movement of those elements before, during, or after use. The frame is further equipped with wheels 6 and, in at least one embodiment, tires 8 to further assist in movement or transport of the device. Although not shown in FIG. 1, one of ordinary skill in the art will recognize that one or more additional wheels may be provided on the device 2 in order to further assist rolling movement.

Device elements 24 may comprise, but are not limited to various known devices for use in high pressure washing units. In a particular embodiment, the mobile washing unit 2 comprises a commercially available Honda GX200 engine as a primary power source and one or more pumps for compressing or moving fluid(s). However, one of ordinary skill in the art will recognize that the present invention is not limited to any particular engine or, for that matter, gas powered engines generally. It will be expressly understood that any known motor or engine suitable for pressurizing fluids may be incorporated within the present invention. Furthermore, while preferred embodiments contemplate the use of gas powered engines and the related mobility that is often associated therewith, alternative embodiments contemplate a wide array of power sources being included with high pressure washing units of the present invention.

As further shown in FIGS. 1 and 2, a frame 4 is provided with hinged elements 14 for selective positioning and/or repositioning of an upper portion 10 of the frame with respect to a lower portion 12 of the frame 4. According to various embodiments, hinged elements 14 comprise lockable features such that the hinged elements 14 may be selectively loosened, upper 10 and lower 12 portions of the frame adjusted with respect to one another and the hinged portions selectively resecured so as to limit undesired movements. In various embodiments, hinged elements 14 allow for a user to adjust the angle of an upper portion of the frame 10, thereby adjusting the overall height of the device 2 and the ability to conform the device 2 to a user's height and/or preference.

In a preferred embodiment, a mobile washer 2 is provided with a support member 25 for maintaining the device 2 in a generally horizontal position with respect to a surface upon which the device rests. In one embodiment, the support member 25 is mounted to a sheet metal base plate and generally disposed in a center potion of the device. Accordingly, a user may easily tilt the device 2 in order to eliminate or reduce contact between the support 25 and the ground/surface and roll the device. In an alternative embodiment, the support 25 comprises one or more wheels such that a tilting operation is not needed to move the device 2.

In one embodiment, one or more portions of the frame 4 comprise telescoping features such that portions of the frame may be extended and/or contracted to further conform to user desired height or position.

In various embodiments, a user proximal portion 16 of the device 2 is provided with a user-interface portion, such as a handle, and a recession or storage area 18. Storage area 18 may further comprise securing means or netting for selectively storing various items (e.g. tools, cleaning products, etc.). User proximal portion 16 may further provide protection for additional device elements in various embodiments or positions as described herein. For example, in a particular embodiment, when the device 2 is placed in a folded or collapsed state, various elements including user-proximal portion 16, storage area 18, tank 20, and frame elements act to isolate and/or protect system components 24. In various embodiments, wheels 6 and/or tires 8 of the device may be sized so as to provide further protection (e.g. from impact, etc.) of device elements 24.

FIG. 3 is a perspective view of one embodiment of the present invention wherein an upper portion 16 is provided with a plurality of nozzles 19 and/or attachments for a hose and wand combination. In one embodiment, a plurality of nozzles 19 is provided to enable a user to select from a number of different impact strengths or spray patterns. Generally, only a single nozzle will be needed for use at a particular time. The present invention provides for an array of nozzles from which to select the most desired nozzle for a specific application and allow non-used nozzles to remain in a secure location on the device where they remain in a safe and convenient location. Indicia are further provided to provide information to a user on nozzle details and, in the case of high impact settings, alert a user to the dangers of the same. In one embodiment, a hose cradle 23 and an elastic material 21 are provided for selectively securing/storing a length of hose when not in use.

In various embodiments, an additional support or grip member 55 is provided. This member 55 provides an additional contact point for a user to assist in various operations and further acts to cover and protect various components 24 when the device 2 is in a folded state.

As shown in FIGS. 4-6, hinged elements 14 further allow for the folding or collapsing of an upper portion 10 of the frame 4. Accordingly, in at least one embodiment, an upper portion 10 of the frame and associated structure 16 may be folded over additional elements 24 of the device 2, thereby substantially reducing the overall height of the device, increasing storage ability of the device, and further protecting various internal elements. Although not shown in FIG. 4, the device 2 may additionally be provided with a latching or locking mechanism at the point where an upper portion of the handle 10 meets a lower portion of the frame 12 when in a folded position. For example, various known clips or clamps may be provided to selectively secure the upper portion 10 with the lower portion 12 when the device 2 is in a folded state. The device 2 in a folded state is particularly well suited for temporary or long term storage and/or transport in a state of non-use. For example, when in a folded state, the device 2 will have a relatively compact structure and generally be more convenient for lifting and carrying, such as when necessary for placing the device 2 in a truck or storage facility.

When the device 2 is in a folded position about hinged elements 14, an upper portion 10 of the frame and lower portion 12 of the frame will meet or be disposed proximal to one another at or near one or more contact points 28. In one embodiment, a portion of the upper section 10 and lower section may generally be parallel with one another when the device 2 is in a folded state. Such an arrangement, however, is not necessary or required to achieve the benefits of the present invention. Thus, in one embodiment, various latches and/or clasps are provided to further secure the device in a closed state. Additionally, hinged elements 14 comprise various locking features to secure the relative position of the upper 10 and lower 12 frame members.

In various embodiments, the frame 4 of the device comprises one or more materials known to provide desirable structural properties without rendering the device unduly heavy or cumbersome. Additionally, mild steel rod, cold rolled flat bar steel and cold rolled steel in sheet form may be provided to construct the frame 4. In an alternative embodiment, the frame 4 comprises lightweight plastic materials, such as high density polyethylene or structurally similar materials. Wheels 6 of the device may be optionally provided with various known tires, including but not limited to 10 inch pneumatic or no-flat tires. Wheels 6 and/or tires 8 of the present invention may be interchangeable with any number of similar wheel and/or tire arrangements to suit the intended application of the device 2 or accommodate user preference.

Referring now to FIGS. 7-8, elevation views of the device 2 according to one embodiment are provided wherein the device additionally comprises a washing wand 30. Washing wand 30 may be provided and connected to additional device elements such as a 25 foot high pressure hose. The wand 30 may be connected to the device through high pressure, quick connect spray nozzles, and may comprise a high pressure lance and high pressure trigger gun for dispensing fluids. The wand 30 may be supported by a cradle portion 31 disposed on or near an upper portion of the frame 10 and/or a lower cone portion 32 or receiving element for accommodating a nose or distal tip end of the wand 30. Accordingly, in various embodiments, a wand 30 may be supported on the device 2 when the device is in an upright or extended position yet the wand is not in a state of use.

Referring now to FIG. 9, a side elevation view of one embodiment of the device 2 is shown wherein the wand 30 has been removed. One of ordinary skill in the art will recognize that a wand 30 may be connected and disconnected with relative ease by, for example, the provision of high pressure quick connect valves and connection members. Accordingly, when one desires to remove the wand 30, this may be readily accomplished by loosening or removing various quick connect couplings and the wand 30 and or hosing removed or attached to the device 2.

As further shown in FIG. 9, an angle 50 is established between portions of the frame 4 divided by a hinged element 14. Angle 50 may be selectively altered or adjusted based on operation of one or more hinged elements 14. In one embodiment, hinged elements 14 may be selectively loosened, the angle 50 between frame elements adjusted by a user on either a discrete or incremental basis, or alternatively through an analog manner such that the angle is not limited to any discreet number or set of positions. Accordingly, in various embodiments, the overall height and orientation of the frame 4 may be selectively adjusted based on user preference. Additionally, hinged elements 14 also provide the functionality of the aforementioned folding of the frame 4 such that upper portion 10 is disposed over device elements 24 and generally proximal (i.e., with respect to an upright position) to a lower frame portion 12 for transport and/or storage of the device 2.

A molded tank feature 20 may additionally be provided on various portions of the device 2. In one embodiment, the tank portion 20 is adapted to be disposed on a lower portion 12 of the frame and provide for storage and/or dispensing of various liquids in addition to protective features for device elements 24. As shown, the tank 20 comprises integrally formed or molded recesses 36 such that device fits securely onto aforementioned frame portion 12. In at least one embodiment, the tank 20 is readily removable and detachable from a frame portion 12 such that any number of tanks 20 may be associated with the device 2. Accordingly, where numerous different liquids are desired for use with device operations, and cross contamination of the these liquids is of concern, a plurality of tanks may be provided with respect to any one device 2 and the tanks and associated liquids easily interchanged.

In a preferred embodiment, a tank 20 comprises a tank for storing and dispensing a chemical or cleaning solution into a flow of water for dispensing from the device 2. The tank 20 houses a solution or chemical based on a user's preference which may be dispensed into a flow of water via a fluid pressure differential provided by a venturi tube. For example, in one embodiment, water from a pump is translated through a venturi and chemical(s) from the tank 20 are drawn into the stream of water at an area of reduced pressure, and the combined water/chemical product dispensed through downstream components of the device.

One of skill in the art will recognize various additional and/or alternative means by which chemicals disposed in a tank 20 may be dispensed. For example, U.S. Pat. No. 7,533,435 to Pedlar et al., which is hereby incorporated by reference in its entirety, discloses various fluid dispensation features which may be incorporated into embodiments of the present invention.

Tank 20, in one embodiment, comprises an optional name plate element 38 wherein a product, company, or manufacturer's name(s) may be displayed either in the form of molding the same to or within the tank and/or a void space for applying preexisting decals.

The tank 20 further comprises an aperture or port 22 for emptying and/or filling operations of the tank. In one embodiment the tank further comprises an additional port or drain (not shown, but 26 in FIG. 6) in a lower portion of the tank to quickly and easily drain undesired contents. Materials may be pressurized and/or conveyed from the tank to features of the invention and for dispensing through various known methods and features.

As further shown in FIGS. 10 and 11, a cone element 32 may be optionally provided within or connected to a tank 20, the cone 32 being secured by fasteners 34 and adapted to accommodate a distal tip or nose end of a wand. In various embodiments, the cone 32 is provided for receiving a distal end of a washing wand in a secure and frictionally engaged manner. Thus, in at least some embodiments, a cone 32 operates to store a wand 30 in a secure manner such that it will not vibrate or become easily displaced, at least at its distal end, during various operations. In one embodiment, a portion of the cone 32 comprises drainage elements 42 for allowing fluids associated with the wand to drain to various locations including, but not limited to, a portion of the tank 20 and/or the external environment.

FIGS. 12A-12D provide additional views of the cone 32 adapted to receive a wand. As shown, the cone may be provided with fins 44 stabilizing the orientation of the cone 32 within a portion of a tank 20 or similar feature within which the cone may be disposed. Drain holes 42 are provided in one or more regions of the cone 32 to allow for drainage of various liquids and prevent undesired build up of such liquids within the cone.

FIG. 13 is a perspective view showing joints or locking elements of hinged elements 14 according to one embodiment. As shown, a metal joint 52 is provided with a plurality of increments or teeth for setting the handle in a variety of user-selected positions. A set-screw 50 or similar device is additionally provided to loosen and secure the metal joint 52 in a desired position. Thus, lockable or selectively securable hinges are provided. It will be expressly recognized that the present invention is not limited to such an arrangement of hinges 14. Indeed, a wide a variety of features for adjusting the position of an upper 10 and/or lower 12 portion of a frame are contemplated. In an alternative embodiment, a releasable pin is provided to enable a user to reposition an upper portion 10 of the frame from a generally upright position to closed position (see, e.g., FIG. 4).

While various embodiments of the present invention have been described in detail, it is apparent that modifications and alterations of those embodiments will occur to those skilled in the art. However, it is to be expressly understood that such modifications and alterations are within the scope and spirit of the present invention, as set forth in the following claims. Further, the invention(s) described herein are capable of other embodiments and of being practiced or of being carried out in various ways. In addition, it is to be understood that the phraseology and terminology used herein is for the purposes of description and should not be regarded as limiting. The use of "including," "comprising," or "adding" and variations thereof herein are meant to encompass the items listed thereafter and equivalents thereof, as well as, additional items.

What is claimed is:

1. A portable pressure washer comprising:
   a frame provided with at least one wheel;
   the frame having an upper portion and a lower portion, the upper portion comprising a first elongate member substantially parallel to an axle of the wheel and a compartment for storage, and the lower portion comprising a second elongate member substantially parallel to the axle of the wheel;
   a primary power source mounted on the frame;
   a pump;
   the upper portion and the lower portion of the frame being hingedly attached by one or more elements and reconfigurable between a first position and a second position;
   the first position characterized in that the upper portion is provided at a first angle with respect to the lower portion such that a user may grasp the upper portion and roll the pressure washer on the at least one wheel; and
   wherein the second position comprises the upper portion at a second angle with respect to the lower portion such that the first elongate member is positioned vertically above, substantially parallel to, and proximal to the second elongate member and the primary power source is substantially surrounded by the frame and covered by the compartment for storage.

2. The pressure washer of claim 1, wherein the lower portion comprises a removable fluid storage tank.

3. The pressure washer of claim 1, wherein the pressure washer comprises a washing wand connected to said pump.

4. The pressure washer of claim 1, wherein the primary power source comprises a gas-powered engine.

5. The pressure washer of claim 1, wherein the primary power source comprises an electric motor.

6. The pressure washer of claim 1, wherein the first upper portion and the second lower portion of the frame are hingedly attached by a pair of lockable hinges.

7. A portable pressure washer comprising:
   a frame provided with at least one wheel;
   the frame having an upper portion and a lower portion, the upper portion and the lower portion each comprising an elongate member substantially parallel to one another and to an axle of the wheel;
   a primary power source mounted on the frame;
   a pump;
   the upper portion and the lower portion of the frame being hingedly attached by one or more elements and reconfigurable between a first position and a second position;
   the first position defined by an position of use with the pressure washer having a first center of gravity; and
   the second position defined by a position of non-use with the pressure washer having a second center of gravity and the elongate member of the upper portion provided in contact with the elongate member of the lower portion such that the primary power source is substantially surrounded by the frame.

8. The portable pressure washer of claim 7, wherein the second center of gravity is closer to the primary power source than the first center of gravity.

9. The pressure washer of claim 7, wherein the lower portion comprises a removable fluid storage tank.

10. The pressure washer of claim 7, wherein the pressure washer comprises a washing wand connected to said pump.

11. The pressure washer of claim 7, wherein the primary power source comprises a gas-powered engine.

12. The pressure washer of claim 7, wherein the primary power source comprises an electric motor.

13. The pressure washer of claim 7, wherein the first upper portion and the second lower portion of the frame are hingedly attached by a pair of lockable hinges.

14. A portable pressure washer comprising:
   a frame having an upper portion and a lower portion;
   the upper portion comprising a handle;
   a primary power source and a pump mounted on the frame;
   at least one wheel on the frame;
   the lower portion of the frame comprising a fluid storage tank, wherein said fluid storage tank is operable to protect the primary power source and contain a predetermined quantity of fluid;
   the tank comprising integrally formed recesses for receiving the lower portion of the frame;
   the tank provided in fluid communication with the pump and a flow of water for dispensing from the pressure washer;
   the upper portion and the lower portion of the frame being hingedly attached by one or more elements and reconfigurable between a first position and a second position;
   wherein the first position comprises the upper portion at a first angle with respect to the lower portion such that a user may grasp the handle and roll the power washer on the at least one wheel;
   wherein the second position comprises the upper portion at a second angle with respect to the lower portion such that the primary power source is substantially surrounded by the frame;
   wherein the second position is characterized in that the handle is provided in contact with the lower portion of the frame.

15. The portable pressure washer of claim 14, wherein the tank is detachable.

16. The portable pressure washer of claim 14, wherein the tank comprises one or more of nylon, polyethylene, and polystyrene.

17. The portable pressure washer of claim 14, wherein the pressure washer further comprises a washing wand and wherein the tank comprises a receiving element for accommodating a distal tip end of the wand.

18. The portable pressure washer of claim 17, wherein the receiving element comprises drainage features for conveying fluid to an external environment.

19. The portable pressure washer of claim 14, wherein the tank is provided in fluid communication with a venturi tube and a primary water source.

20. A portable pressure washer comprising:
   a frame having an upper portion and a lower portion;
   the upper portion of the frame comprising a user-interface portion and a compartment for storage;

the lower portion of the frame comprising at least one of a primary power source, a pump, and a tank;

the upper portion and the lower portion of the frame being hingedly attached by one or more elements and reconfigurable between a first position and a second position;

the first position comprising a position of use, and the second position characterized in that the user-interface portion of the upper portion is provided in contact with the lower portion and wherein the lower portion, the upper portion and the compartment for storage substantially surround the primary power source.

21. The portable pressure washer of claim 20, wherein at least one wheel is provided on the frame, the at least one wheel further adapted to protect the primary power source.

22. The portable pressure washer of claim 20, wherein the tank is detachable.

23. The portable pressure washer of claim 20, wherein the lower portion comprises a tank comprising one or more of nylon, polyethylene, and polystyrene.

24. The portable pressure washer of claim 20, wherein the pressure washer further comprises a washing wand and wherein the tank comprises a receiving element for accommodating a distal tip end of the wand.

25. The portable pressure washer of claim 24, wherein the receiving element comprises drainage features for conveying fluid to an external environment.

* * * * *